(12) United States Patent
Donovan et al.

(10) Patent No.: US 9,339,016 B1
(45) Date of Patent: May 17, 2016

(54) MOLLUSCAN BIVALVE CAGE SYSTEM

(71) Applicants: Barry M. Donovan, Silver Spring, MD (US); Mark C. Slifko, Fairfax, VA (US)

(72) Inventors: Barry M. Donovan, Silver Spring, MD (US); Mark C. Slifko, Fairfax, VA (US)

(*) Notice: Subject to any disclaimer, the term of this patent is extended or adjusted under 35 U.S.C. 154(b) by 103 days.

(21) Appl. No.: 14/517,384

(22) Filed: Oct. 17, 2014

Related U.S. Application Data

(60) Provisional application No. 61/892,428, filed on Oct. 17, 2013.

(51) Int. Cl.
*A01K 61/00* (2006.01)

(52) U.S. Cl.
CPC ............. *A01K 61/002* (2013.01); *A01K 61/007* (2013.01)

(58) Field of Classification Search
CPC .......................... A01K 61/002; A01K 61/007
USPC ......................................................... 119/239
See application file for complete search history.

(56) References Cited

U.S. PATENT DOCUMENTS

| | | | |
|---|---|---|---|
| 2,989,945 A | 6/1961 | Ford | |
| 4,147,130 A * | 4/1979 | Goguel | A01K 61/007 119/223 |
| 4,186,687 A | 2/1980 | Gilpatric | |
| 4,244,323 A * | 1/1981 | Morimura | A01K 61/007 119/223 |
| 4,257,350 A * | 3/1981 | Streichenberger | A01K 61/007 119/223 |
| 4,351,268 A * | 9/1982 | Blair | A01K 61/007 119/223 |
| 4,395,970 A * | 8/1983 | Kunkle | A01K 61/002 119/240 |
| 4,766,846 A | 8/1988 | Lavoie | |
| 5,007,377 A | 4/1991 | Muench, Jr. | |
| 5,251,571 A * | 10/1993 | Willinsky | A01K 61/007 114/256 |
| 5,299,530 A * | 4/1994 | Mukadam | A01K 61/007 119/223 |
| 5,359,962 A * | 11/1994 | Loverich | A01K 61/007 119/223 |
| 5,400,745 A | 3/1995 | Saxby et al. | |
| 5,412,903 A * | 5/1995 | Zemach | A01K 61/007 43/102 |
| RE34,971 E * | 6/1995 | Loverich | A01K 73/12 119/223 |
| 5,653,193 A | 8/1997 | Marissal | |
| 5,713,303 A * | 2/1998 | Willinsky | A01K 61/008 119/218 |
| 5,845,602 A * | 12/1998 | Kaarstad | A01K 61/007 119/223 |
| 5,970,917 A * | 10/1999 | Keith, Jr. | A01K 61/007 119/223 |
| 6,044,798 A | 4/2000 | Foster et al. | |
| 6,216,635 B1 * | 4/2001 | McRobert | A01K 61/007 119/201 |
| 6,481,378 B1 * | 11/2002 | Zemach | A01K 61/007 119/223 |
| 6,539,894 B1 * | 4/2003 | Byrne | A01K 61/002 119/234 |
| 7,341,021 B2 | 3/2008 | Cortinas et al. | |
| 7,587,991 B2 | 9/2009 | Buck et al. | |
| 7,650,856 B2 | 1/2010 | Quinta Cortiñas et al. | |
| 7,661,389 B2 * | 2/2010 | Tuerk | A01K 61/007 119/215 |
| 7,681,528 B2 * | 3/2010 | Ytterland | A01K 61/007 119/203 |
| 7,748,349 B2 * | 7/2010 | Thorvardarson | A01K 61/007 119/223 |
| 2003/0094141 A1 | 5/2003 | Davis | |
| 2004/0123809 A1 * | 7/2004 | Klein | A01K 61/007 119/223 |
| 2011/0265730 A1 * | 11/2011 | Farrington | A01K 61/002 119/239 |
| 2013/0186345 A1 * | 7/2013 | Leslie | A01K 61/002 119/240 |

\* cited by examiner

*Primary Examiner* — Joshua Huson
(74) *Attorney, Agent, or Firm* — Rosenberg, Klein & Lee

(57) ABSTRACT

A molluscan bivalve cage system includes a cage formed of a mesh material of sufficient porosity to allow entry of molluscan bivalves. A fixed buoyant mechanism is secured to an upper surface of the cage and an anchor counterweight mechanism maintains the bivalve cage in a relatively stable position within a marine environment. An adjustable stirrup mechanism adjusts the height of the bivalve cage above the bed of a marine environment during various stages of growth of the molluscan bivalves.

17 Claims, 9 Drawing Sheets

MOLLUSCAN BIVALVE CAGE SYSTEM

REFERENCE TO RELATED APPLICATIONS

This Application is based upon Provisional Patent Application Ser. No. 61/892,428 filed on 17 Oct. 2013 which is hereby incorporated by reference.

FIELD OF THE INVENTION

This invention is directed to the field of growing-out of oysters or other molluscan bivalve species at a pre-set depth above a sea bed within a marine environment.

This invention pertains to the field of rearing and maturing of oyster seed stocks and other molluscs through aquaculture in an off-bottom mounted system.

This invention pertains to the field of natural propagation of mature oysters or other molluscan bivalve species within a predetermined depth in a water column.

This invention further relates to the field of systems for cleansing of contaminated oysters or other molluscan bivalve species at predetermined depths within a marine environment.

This invention further pertains to the field of growing, propagation and/or depuration of oysters or other molluscan bivalve species in a marine environment in areas where marine conditions support the growth of oysters or other molluscan bivalve species, but where the bottom conditions of the sea bed naturally inhibit the establishment of oyster or other bivalve species habitat.

Still further, the subject invention pertains to the field of aquaculture which permits oyster or other molluscan bivalve species to grow-out within a marine environment in the open ocean, open bay, and other areas that are not located within designated shellfish lease areas.

BACKGROUND OF THE INVENTION

In conventional mollusc farming systems in systems envisaged for calm waters, material is generated, which in high concentrations disturb and destabilize the eco-system. This environmental pollution has a negative effect on the ecological balance, since it causes a reduction in the flow of plankton and reduces the feed of the molluscs. This in turn reduces the production of the desired crop. In less calm waters, and at various depths, there is a higher amount of nutrients, which is reflected in greater and quicker growth of the molluscs attached to culture ropes that can be displaced by the water.

Shellfish aquaculture is a growing field which is constrained by the scarcity and cost of land-based hatchery and nursery operations. Generally, the high capital and operating costs associated with these facilities along with their vulnerability to instances of low water quality and the scarcity of potential locations is a disadvantage.

Thus, the subject invention concept relates to an apparatus and system for farming marine animals and specifically relates to a floating aquaculture apparatus for cultivating molluscan bivalve species including oysters through maturity for commercial harvesting.

PRIOR ART

There are many traditional shellfish breeding systems and methods known in the prior art. However, these prior art systems generally have the disadvantage of not providing for both a positive and negative buoyant system. Many of the prior art systems do not provide for adjustability as to the depth of the cages or other containment areas.

One such prior art shown in U.S. Pat. No. 4,186,687 is directed to a system for growing oysters and other molluscs. However, this system relies upon a set of rearing cribs associated with rearing young and maturing oysters. However, such systems do not provide for any positive buoyancy mechanism attached to an upper surface of the cribs, nor does it show a negative buoyancy mechanism to maintain the cribs on the bed of a marine environment. In such systems, the cribs cannot be easily adjusted as to the height of the cribs within the marine environment.

U.S. Pat. No. 6,044,798 is directed to another type of floating aquaculture system which provides for a plurality of elongated modules used apparently as a positive buoyancy technique wherein the modules float on the top surface of the marine environment. Cages are mounted to the modules 30 through a series of lines coupled on opposing ends to the modules 30 and the cages. However, these cages simply float in the water and do not have a negative buoyancy mechanism and further, although there may be a positive buoyancy provided by the modules, such are not connected in an integrated fashion to the cages.

Other prior art such as shown in U.S. Pat. No. 5,653,193 are directed to devices for growing molluscs and in particular, oysters. Such systems provide for buoys connected to cables beneath the water's surface which in turn have a series of Japanese lantern-like structures hung from hawsers. Once again, such prior art does not provide for the positive buoyancy of the subject system in an integrated manner where the positive buoyancy mechanism is secured to the growing cage.

Still other prior art such as that shown in U.S. Pat. No. 7,650,856 provide for submersible farm systems which include buoys in a complicated arrangement with respect to a flotation structure. Such a system does not provide for the positive buoyant mechanism attached to an upper surface of the cage.

Thus, there is a long felt need for the obtaining of a molluscan bivalve cage system which imparts both positive and negative buoyancy to a molluscan bivalve cage with adjustability as to the height of the cage above a sea bed. Further, there is the need for a molluscan bivalve cage system which permits simple access, assembly, and disassembly of the system subsequent to the removal of the bivalve cage from the marine environment.

SUMMARY OF THE INVENTION

A molluscan bivalve cage system is provided which includes a molluscan bivalve cage formed of a liquid porous composition of sufficient porosity and adapted to prevent egress of molluscan bivalves into the marine environment and allow plankton with sufficient water into the bivalve cage. The molluscan bivalve cage system further includes a fixed buoyant mechanism secured to an upper surface of the molluscan bivalve cage to provide a positive buoyancy to the cage. An anchor counterweight mechanism on the seabed provides a negative buoyant component which maintains the molluscan bivalve cage and holds the cage in a relatively stable position within a marine environment. An adjustable stirrup mechanism attached to the anchor counterweight can adjust the height of the molluscan bivalve cage above the bed of the marine environment during various stages of growth of the molluscan bivalves.

One object of the subject system is to provide for a molluscan bivalve cage system which allows natural propagation of mature oysters or other molluscan bivalve species at some predetermined depth in a water column in a geographic location in a water body.

A further object of this invention is to provide a molluscan bivalve cage system which permits cleansing of contaminated oysters or other molluscan bivalve species while at predetermined depths within a marine environment.

A still further object of the subject system is to provide a molluscan bivalve cage system which includes both positive and negative buoyancy mechanisms to a cage which allows oysters and other molluscan bivalve species to be grown within the water column.

A further object of the subject molluscan bivalve cage system is to provide a cage system which can easily be assembled and disassembled.

A further object of the system application system is to provide a molluscan bivalve cage system which allows for the grow-out of oyster spat or other molluscan bivalve species devoid of using pre-fabricated commercial shellfish grow-out bags for bivalve spat sizes greater than a predetermined dimension.

A still further object of this application system is to provide a molluscan bivalve cage system which can be set at predetermined depths within a marine environment which allows these depths to be adjustable during varying phases of the growth of the molluscan bivalve species.

DESCRIPTION OF THE PREFERRED EMBODIMENTS

Figure 1:
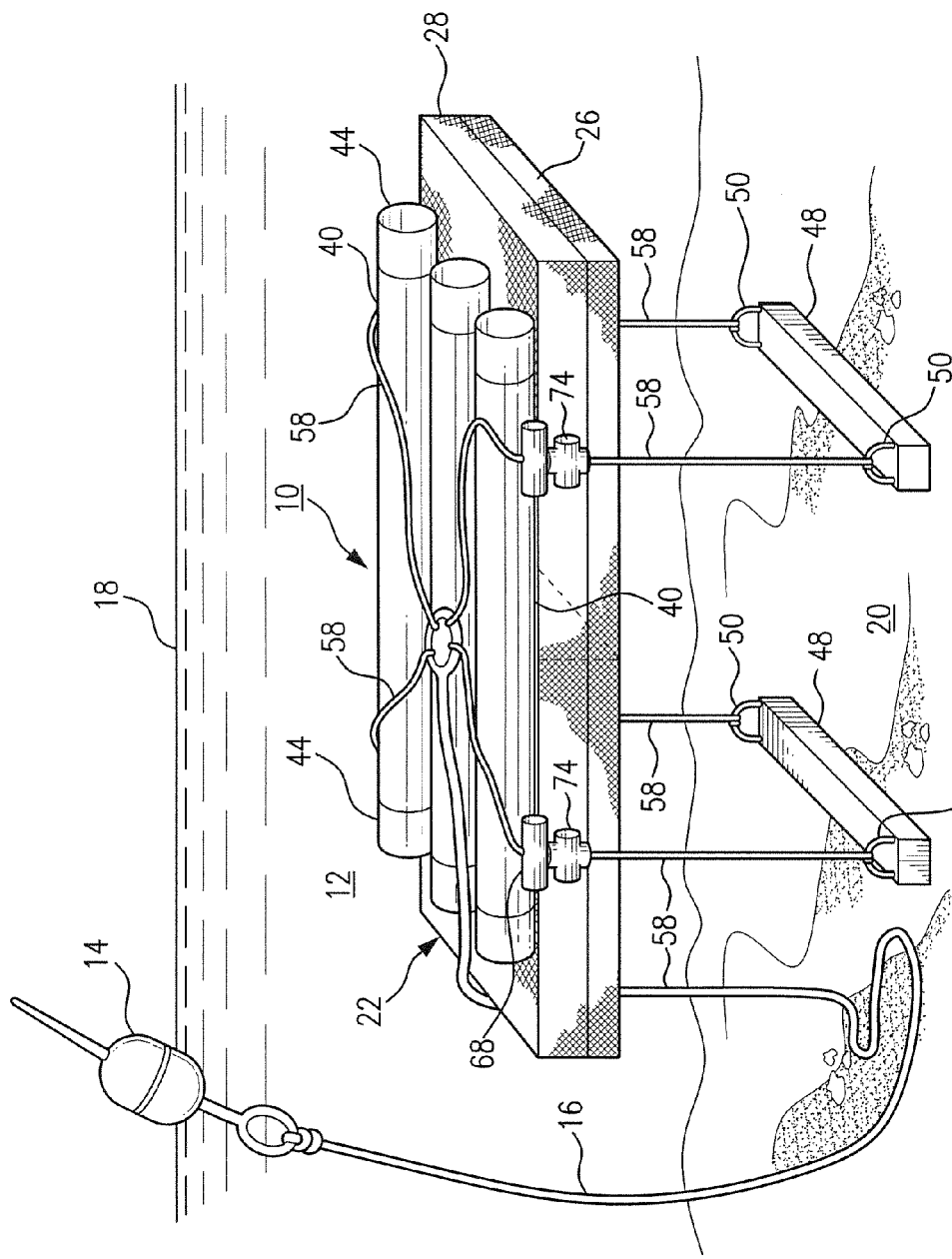
FIG. 1 is a schematic perspective view of the molluscan bivalve cage system.

Referring now to FIG. 1, there is shown molluscan bivalve cage system 10 for maintaining a molluscan bivalve cage 22 within marine environment 12 and positioned at an adjustable and predetermined height above sea bed 20. A buoy 14 is connected or otherwise tethered to molluscan bivalve cage 22 through buoy line 16, as shown in FIG. 1. Buoy 14 floats on water surface 18 to provide indication of a general location of molluscan bivalve cage system 10 located beneath the water surface 18.

In overall concept, molluscan bivalve cage system 10 allows for natural propagation or spawning of oysters or other molluscan bivalve species within a predetermined depth in a water column in molluscan bivalve cage 22 which acts as a point source by using predominant tides and currents and natural settlement in open ocean, open bay, river, and creek mouths, over-productive oyster reefs and depleted oyster reefs, as well as in areas where oyster introduction and growth is desired.

Molluscan bivalve cage system 10 includes the molluscan bivalve cage 22 formed of a liquid porous composition of sufficient porosity and adapted to prevent egress of molluscan bivalves and oysters to exit the molluscan bivalve cage 22. As is seen in FIGS. 1, 2A, 2B, 3A, and 3B, molluscan bivalve cage 22 is formed of a mesh type material construction 24 and includes main body 26 and cage door 28 adapted to be closed over main body 26, as seen in FIGS. 3A, 3B. Main body 26 and cage door 28 are generally formed of a mesh material where a 16-gauge PVC coated welded wire having a 0.5×0.5" mesh is provided for preventing egress of the molluscan bivalves and/or oysters. Other types of mesh composition may be used such as a plastic composition, stainless steel, or other like compositions which are relatively resistant to deterioration in a marine environment.

Figure 2A:
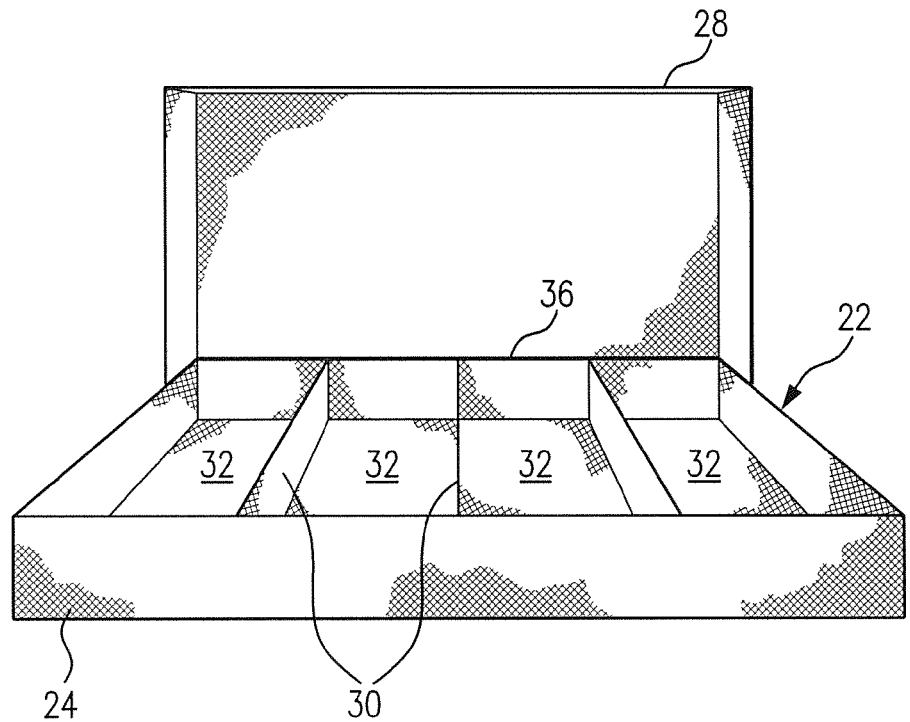
FIG. 2A is a perspective view of the molluscan bivalve cage showing the cage in an open position.
Figure 2B:
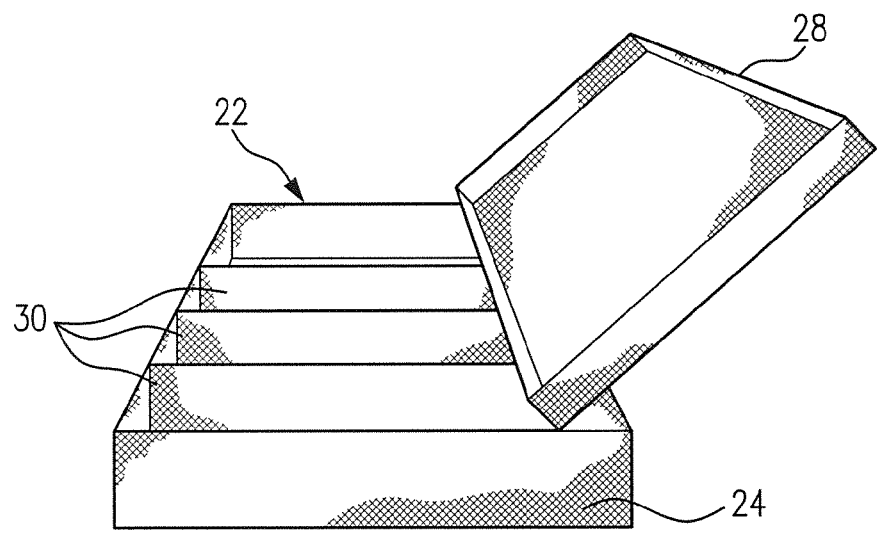
FIG. 2B is a perspective view of the molluscan bivalve cage showing the cage door opened with respect to the main body.
Figure 3A:
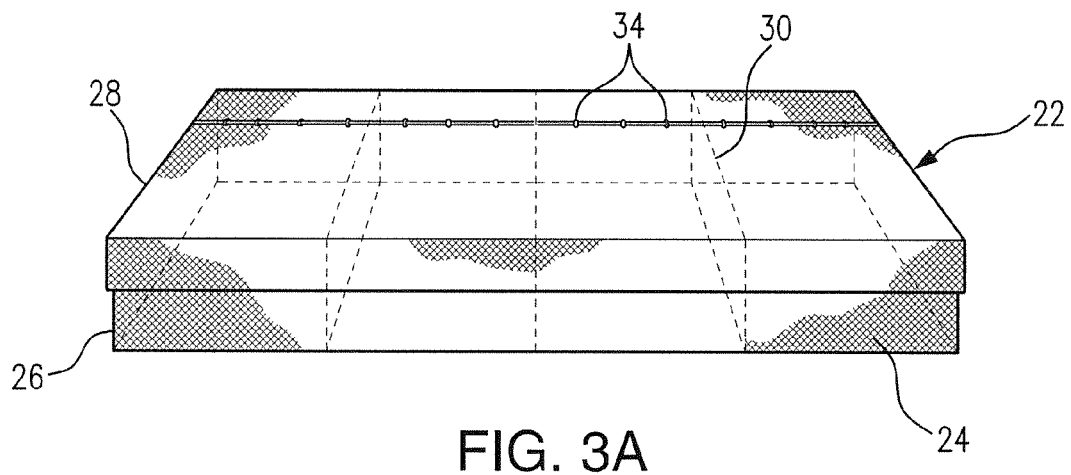
FIG. 3A is a perspective view of the molluscan bivalve cage in a closed position.
Figure 3B:
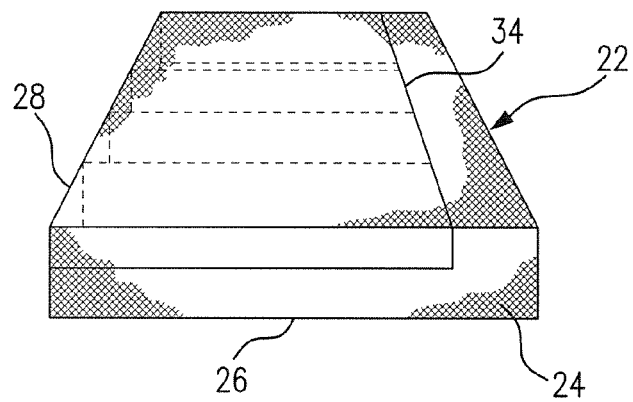
FIG. 3B is a perspective view of the molluscan bivalve cage in a closed position showing a stitching coupling between the cage door and the main body.

Main body 26 includes a plurality of baffles 30 attached to rear and frontal walls of main body 26 for forming individual main body compartments 32, as seen in FIGS. 2A, 2B. Baffles 30 are also composed of a mesh material having approximately a 0.5×0.5" mesh and is generally formed of the same material composition as the remaining portions of the main body 26. Baffles 32 provide support for main body 26 and constrain the load of oysters or other molluscan bivalve species from shifting within the main body 26 for maintaining stabilization of molluscan bivalve cage 22 during wave and/or current action and/or molluscan bivalve cage system 10 displacement within the marine environment.

Cage door 28 is mounted in a rotatable manner with respect to main body 26 to permit opening and closing of molluscan bivalve cage 22. In one form, cage door 28 may be stitched to main body 26 by stitches 34 shown in FIGS. 3A and 3B, or alternatively, may be hinged by hinge mechanism 36, shown in FIG. 2A, to allow opening and closing of main body compartments 32.

Figure 4A:
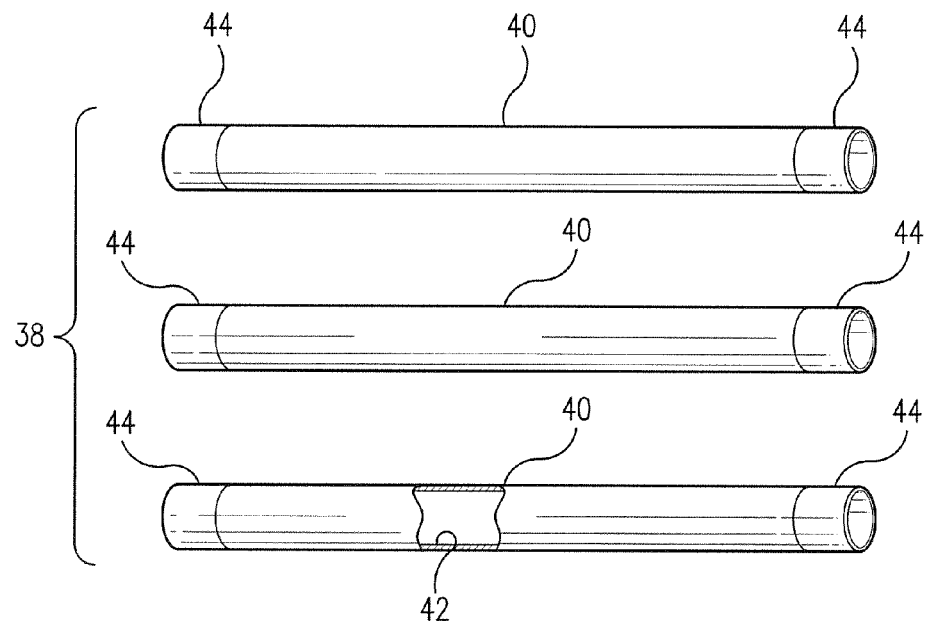
FIG. 4A is a perspective view of the fixed buoyant mechanism consisting of a plurality of tubular members.
Figure 4B:
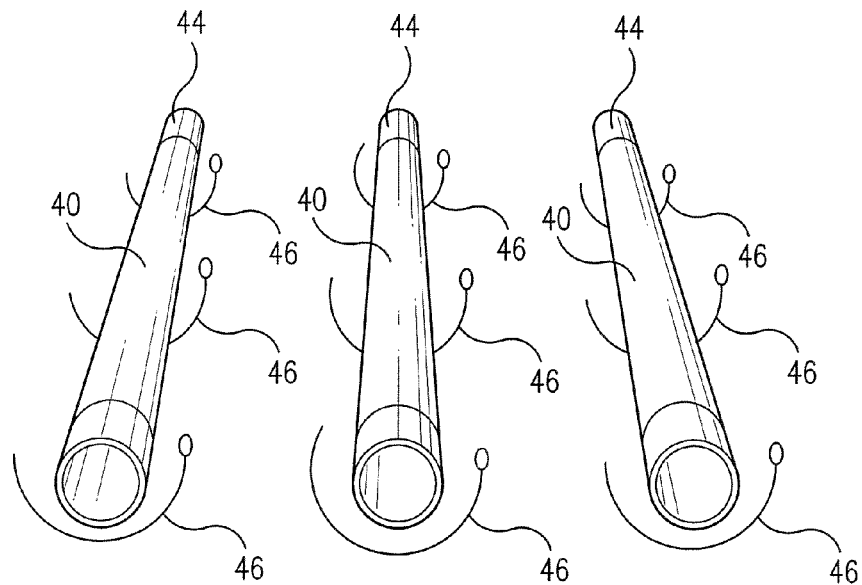
FIG. 4B is a perspective view of the fixed buoyant mechanism with security straps.
Figure 5A:
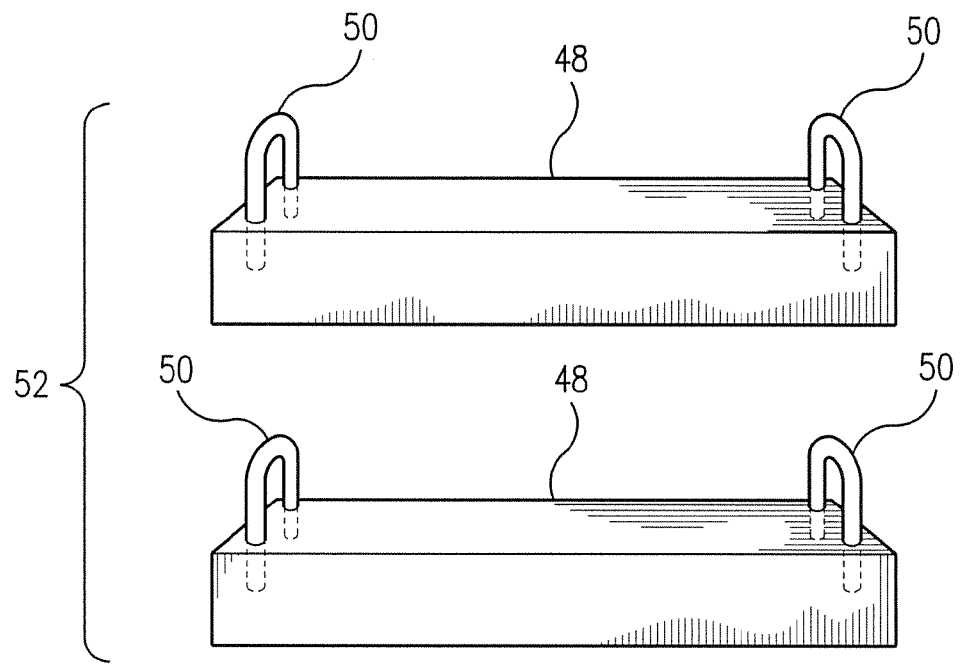
FIG. 5A is a perspective view of the anchor counterweight mechanism.
Figure 5B:
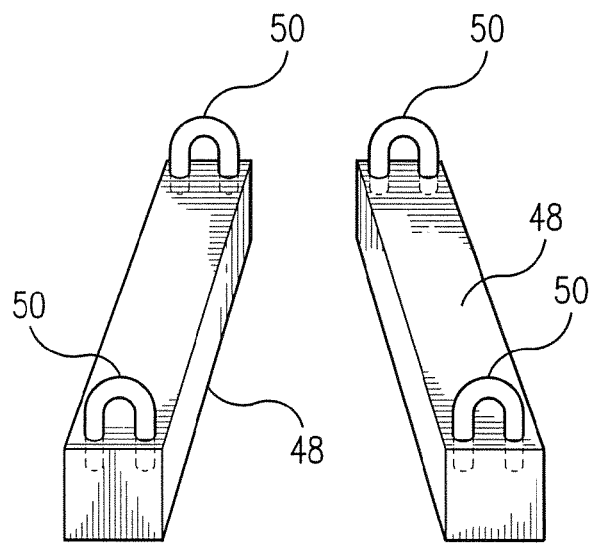
FIG. 5B is an elevational perspective view of the anchor counterweight mechanism.

Molluscan bivalve cage system 10 further includes fixed buoyant mechanism 38 shown in FIG. 4A which is secured to an upper surface of bivalve cage 22. Fixed buoyant mechanism 38 may include a plurality of buoyant tubular members 40 having a through opening which defines tubular member chamber 42 to provide buoyancy when bivalve cage system 10 is submerged. In general, tubular chambers 42 of buoyant tubular members 40 contain air or other gaseous composition, or even a liquid having a predetermined density to allow adjustment of the buoyancy of fixed buoyant mechanism 38.

Each buoyant tubular members 38 includes a pair of end caps 44 secured in an airtight manner to a respective buoyant tubular member 40. Buoyant tubular members 40 may be formed of a polyvinyl chloride composition or some like composition which would create an airtight material tubing chamber 42. End caps 44 may be formed of a similar material as that of buoyant tubular members 40, not important to the inventive concept as herein described, with the exception that any air or other gaseous composition contained within tubular chamber 42 is maintained therein during operation of molluscan bivalve cage system 10 when submerged. End caps 44 may be secured to respective buoyant tubular members 40 through threaded engagement, welding, or some like technique. Each of buoyant tubular members 40 may be secured to an upper surface of cage door 28 by a plurality of buoyant attachment straps 46 which may be secured through the mesh-like cage door 28 for fixedly mounting buoyancy tubular members 40 to bivalve cage 22.

Buoyant mechanism 38 provides a fixed positive buoyancy to molluscan bivalve cage 22. The fixed buoyant mechanism 38 provides a predetermined or calculated buoyancy based upon the dimensions and weight of the fixed buoyancy mechanism 38. The buoyancy of the fixed buoyancy mechanism 38 is dependent upon the submerged weight of the molluscan bivalve cage 22 fully loaded with adult oysters or other molluscan bivalve species. Fixed buoyant mechanism 38 provides sufficient positive buoyancy to maintain the submerged cage 22 and its contents in a positive buoyant condition throughout the growth period of spat to fully grown mature oysters or other bivalves.

Anchor counterweight mechanism 52 is formed of generally rectangular cement blocks with anchor counterweight attachments 50 in the form of U-rings or some like attachment mounted on opposing ends of each counterweight 48. As will be seen in following paragraphs, anchor counterweight attachments 50 are secured to stirrup lines 58 which are ultimately secured to shackle bolt 54 and pull line 56, as is seen in FIG. 8.

The total submerged weight of the counterweights 48 is designed to provide a greater downward force (toward seabed 20) than the upward force provided by fixed buoyant mechanism 38 with its associated buoyant tubular members 40. Anchor counterweights 48 provide for an anchoring mechanism for molluscan bivalve cage 22 when they are attached to stirrup mechanism 60, as shown in FIGS. 1 and 8. When two counterweights 42 are used, they operate as a pair of counterweights, and in this configuration, stability is provided to cage 22 through four stirrup lines 58 and the user may manually operate one counterweight 48 independent of the other counterweight 48.

Cage system 10 further includes adjustable stirrup mechanism 60 for adjusting the height of molluscan bivalve cage 22 above the sea bed 20 within the marine environment 12 during various stages of growth of the molluscan bivalves.

Figure 6:
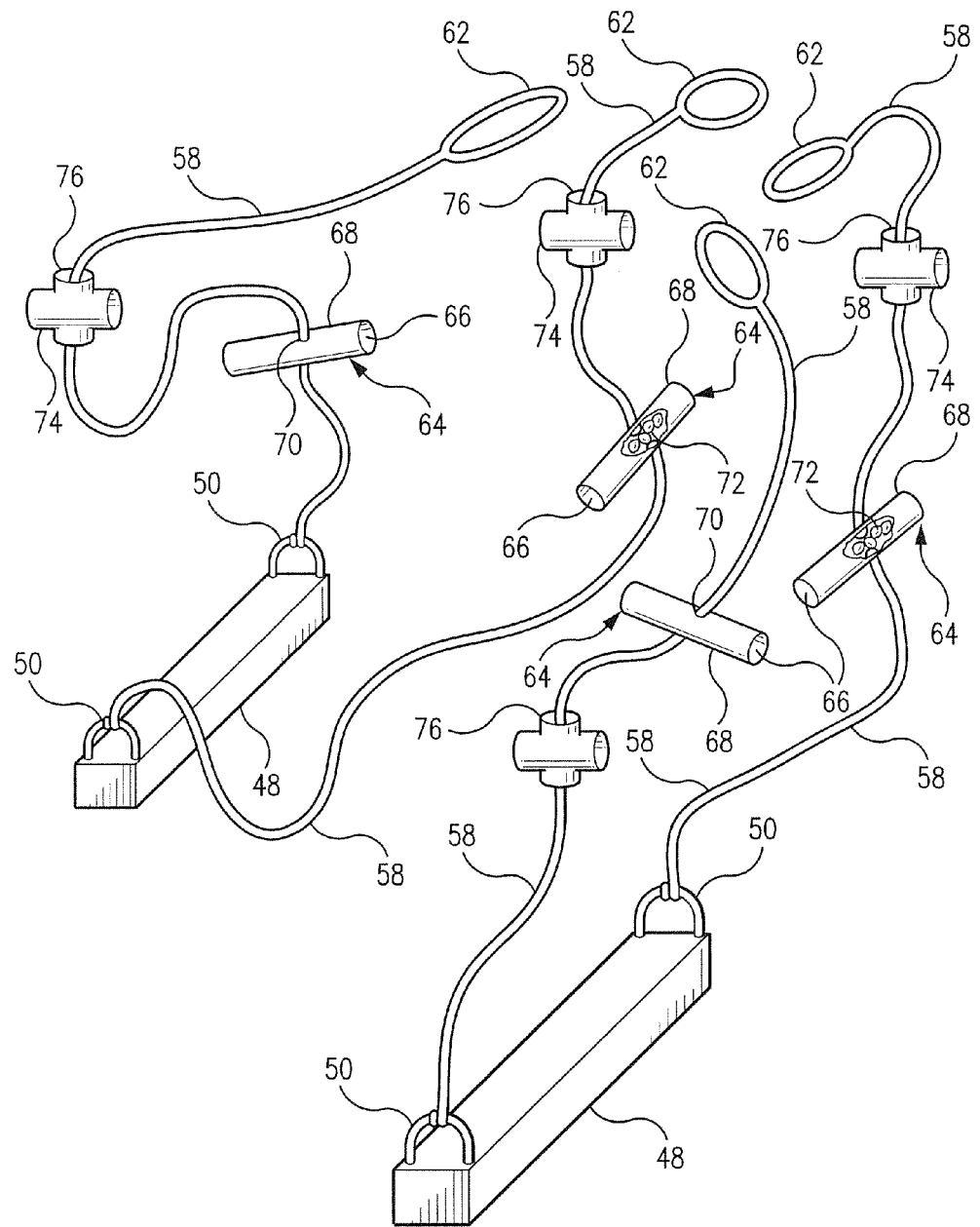
FIG. 6 is a schematic perspective view of an adjustable stirrup mechanism mounted to the anchor counterweight mechanism.
Figure 7:
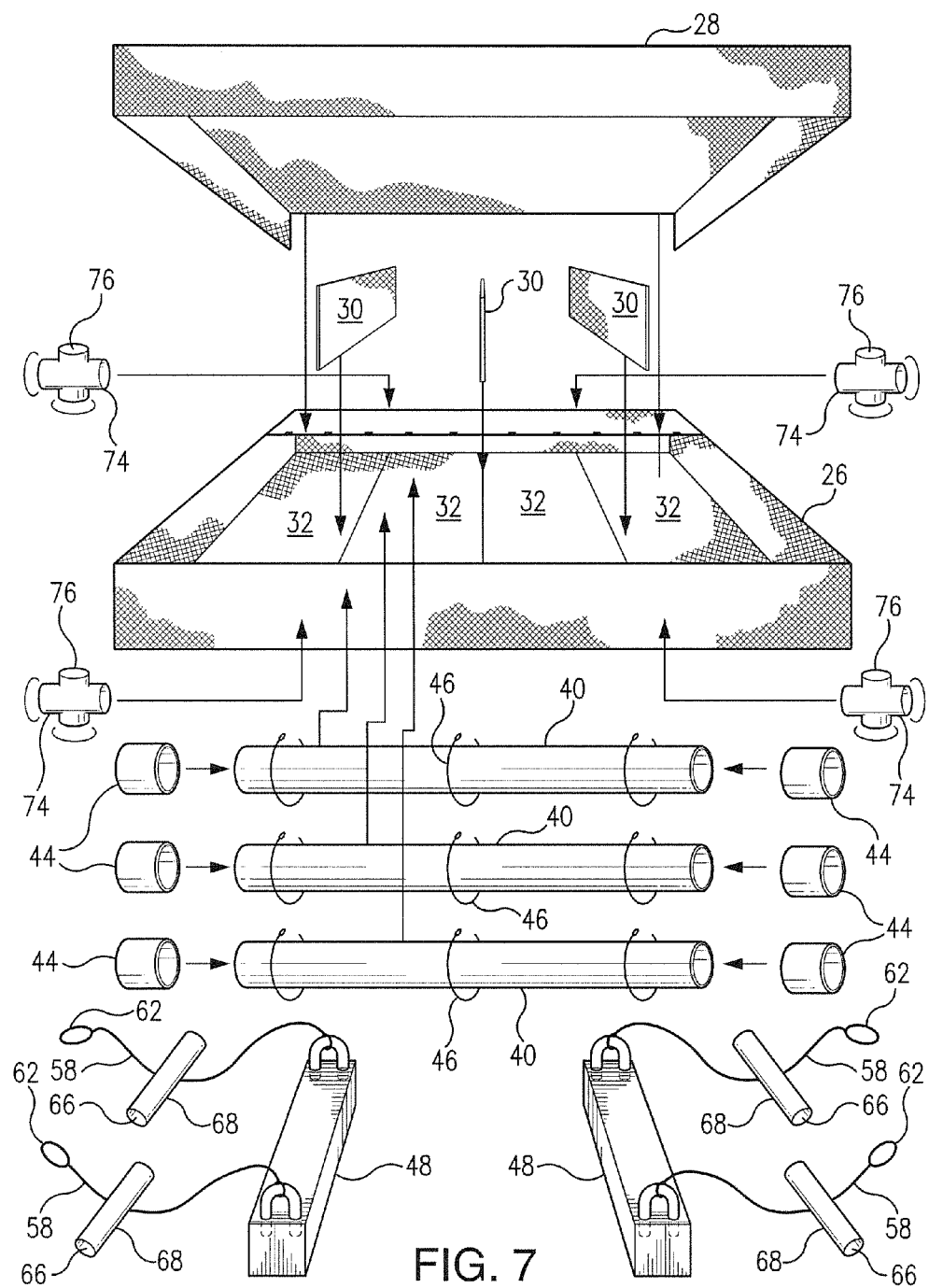
FIG. 7 is an exploded view of the molluscan bivalve cage system.
Figure 8A:
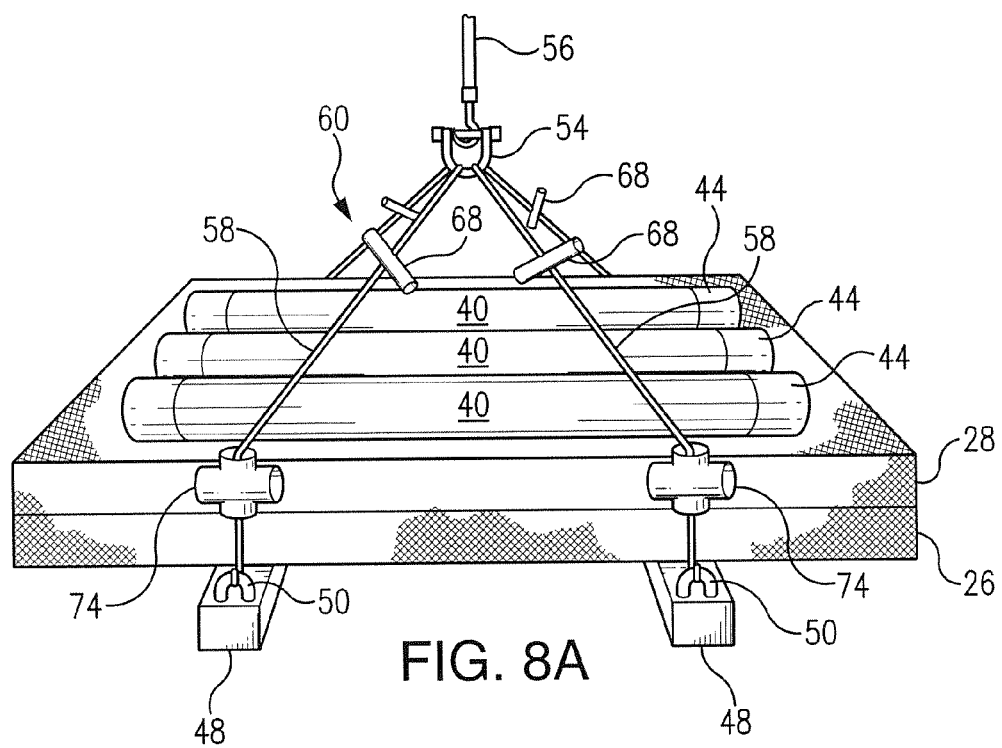
FIG. 8A is a schematic perspective view of the molluscan bivalve cage system showing attachment to a lead line; and, FIG. 8B is an end perspective view of the molluscan bivalve cage system showing attachment to a lead line.
Figure 8B:
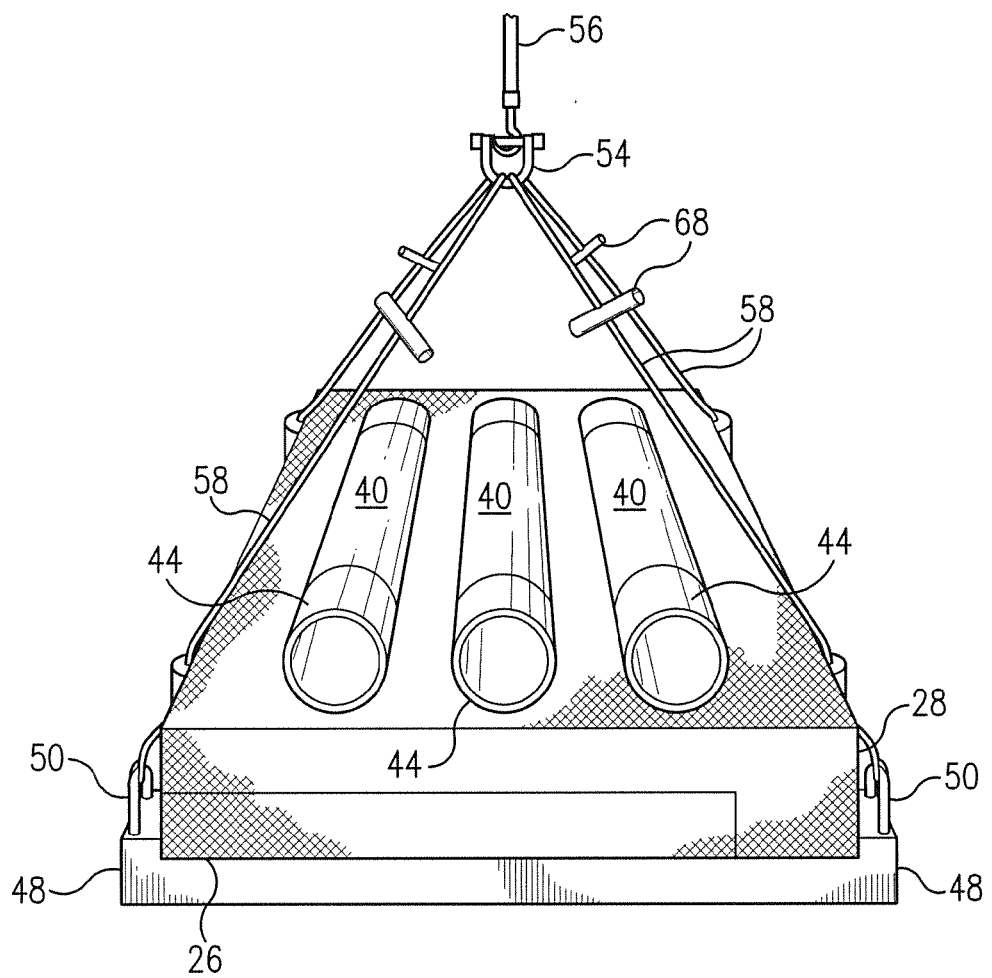

Adjustable stirrup mechanism 60 include stirrup lines 58 as seen in FIGS. 6-8, which are secured to respective anchor counterweights 48 on opposing ends of the counterweights 48 by attachment to anchor counterweight attachments 50. Stirrup lines 58 are secured to respective counterweights 48 on a first end and extend to a second end where they are attached to shackle bolt 54, as seen in FIGS. 6 and 8A and 8B. Each of stirrup lines 58 may be formed on the second end in a loop configuration 62 seen in FIG. 6 for easy attachment to shackle bolt 54.

Stirrup mechanism 60 further includes stirrup line length adjusting mechanism for adjusting a length of each of the stirrup lines 58. Stirrup line length adjusting mechanisms 64 may be formed of tubular members 68 having a tubular through opening extending in a direction of the extension of tubular members 68. Each tubular member 68 includes an opening having an axis directed in a substantially perpendicular direction to an axis of tubular through opening 66 where the opening 70 allows displacement of a respective stirrup line 58 passing therethrough, as is seen in the Figures. In this manner, tubular member 68 may slidingly engage with a respective stirrup line 58. Tubular opening 70 has a predetermined diameter and a knot 72 may be formed internal to tubular members 68 having a diameter or extension larger than the diameter of tubular opening 70 in order to negate the possibility that stirrup line 58 can be pulled through opening 70. In this manner, stirrup line length adjusting mechanism 60 serves as a stop member for placement of cage 22 at a predetermined depth below water surface 18.

Stirrup mechanism 60 further includes stirrup line guides 74 secured to molluscan bivalve cage 22 for guiding a portion of the respective stirrup line 58 in a substantially vertical direction with respect to the respective counterweights 48 when cage 22 is submerged in the marine environment. Stirrup line guides 74 include stirrup line guide through openings 76. Stirrup line guide through openings 76 have a larger diameter than a respective stirrup line 58 and permit sliding engagement of stirrup line 58 with respect to stirrup line guide 10. Stirrup line guides 74 are securely mounted to molluscan bivalve cage 22 by any well-known technique of attachment, such as plastic welding, securement by straps, or like techniques. The purpose of stirrup line guides 74 is to allow the stirrup lines 58 to pass vertically and freely through the stirrup line guide 74. Stirrup line guides 74 may be mounted to cage 22 through line guide straps or any other well-known mechanism.

Stirrup mechanism 60, as has been indicated, consists of a plurality of stirrup lines 58 which provides stability to the positively buoyant components of molluscan bivalve cage system 10 within a water column and secures the anchoring counterweights 48 to the buoyant components 40 of the fixed buoyant mechanism 38 and permits for deployment and retrieval of molluscan bivalve cage system 10. One end of each stirrup line 58 attaches to the anchor counterweight attachment 50, as has previously been discussed.

In order to permit simple disassembly of cage system 10, the outer diameter of tubular members 68 are less than the diameter of stirrup line guide through openings 76. Thus, when disassembly is needed, individual tubular members 68 may be rotated into alignment with stirrup line guide through openings 76 and passed through a respective stirrup line guide 74 along with the respective stirrup line 58. In this manner, the stirrup lines 58 are removed from cage 22 in a simple manner. The removal of the stirrup lines 58 is shown in FIG. 6 in three cases where the tubular members 68 have passed through stirrup line guide through opening 76 with the result that the stirrup lines 58 and loop ends 62 may be released from cage 22.

Each of the stirrup line guides 74 are attached securely to the external longitudinal side of the cage body 26 possibly using the stirrup line guide attachment straps, such as plastic zip-ties or other secure means of attachment. As stated, the purpose of the stirrup line guide 74 allows the stirrup lines 58 to pass vertically and freely through the stirrup line guide 74 and provides for equalization of forces applied.

Shackle bolt 54 shown in FIGS. 8A, 8B, provides for a common attachment point for each of stirrup lines 58. In the retrieval position, stirrup line length adjusting mechanisms 64 are pulled away from the tops of the stirrup line guides 74 and will pull the anchor counterweights 48 against a respective cage 22 bottom surface to support the cage 22 in a cradling configuration. The fixed buoyant mechanism 38 consisting of the buoyant tubular members 40 is mounted on an upper surface of the cage 22 and further provides longitudinal support for system 10.

In overall use and operation of molluscan bivalve cage system 10, molluscan bivalve cage 22 is placed on a flat surface with cage door 28 being opened and oysters (spat or mature) or other molluscan bivalve species are placed in substantially equal numbers in each compartment 32 of main body 26. Cage door 28 is then secured to main body 26. A determination of the desired distance from the sea bed 20 at the buoyant cage will be positioned within the water column is made. Positioning of each stirrup line length adjusting mechanism and tubular member 68 is made by running the associated stirrup line 58 perpendicular to the tubular members 68 through tubular openings 70 positioned substantially at the center of the stirrup line length adjusting mechanism 64.

Securement is made by tying a knot 72 on the stirrup line 58 in a manner where it is captured within tubular members 68. Each end of stirrup lines 58 are secured to each of the counterweights 48. The counterweights 48 are generally aligned perpendicular to the length of the main body 26, as is shown in the Figures, so that the ends of each counterweight 48 are mounted beneath each of the stirrup line guides 74 which are secured to the molluscan bivalve cage 22.

The loop end of the stirrup lines 58 in the looped configuration 62 are pulled vertically up through the stirrup line guide 74 and may continue to pull the attached stirrup line length adjusting mechanism 64 up through the stirrup line guide 58 by essentially rotating it into a vertical extended direction until the tubular member 68 passes through stirrup line guide 74. The four looped ends 62 of the stirrup lines 58 are then attached to shackle bolt 11 in order that all stirrup lines rest on the top of the fixed buoyancy apparatus at the general center of the cage configuration. Once a hoist hook is attached to a position of the lead line 56 near the shackle bolt 54, the entire system 10 is lowered into the water environment. Anchor counterweights 48 sink to the bed 20 and cage 22 remains buoyant at a predetermined distance within the water column from the bed 20.

Upon retrieval of system 10, the counterweights 48 may be detached by releasing the stirrup lines 58 from shackle bolt 54 and reversing tubular members 68 into a substantially vertical direction for passage of tubular members 68 through stirrup line guides 74 and pulling the stirrup lines 58 free from cage 22.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A molluscan bivalve cage system comprising:
   (a) a molluscan bivalve cage formed of a liquid porous composition of sufficient porosity adapted to prevent egress of molluscan bivalves to exit said molluscan bivalve cage and allow sufficient water flow to permit plankton to enter said bivalve cage;
   (b) a fixed buoyant mechanism secured to an upper surface of said molluscan bivalve cage;
   (c) an anchor counterweight mechanism for maintaining said molluscan bivalve cage in a relatively stable position within a marine environment; and,
   (d) an adjustable stirrup mechanism for adjusting the height of the molluscan bivalve cage above a bed of said marine environment during stages of growth of said molluscan bivalves;
   wherein said adjustable stirrup mechanism includes:
   (i) at least one stirrup line secured to said anchor counterweight mechanism on a first end thereof and to a pull line on a second end thereof;
   (ii) at least one stirrup line length adjusting mechanism for adjusting a length of said at least one stirrup line; and,
   (iii) at least one stirrup line guide secured to said molluscan bivalve cage for guiding a portion of said at least one stirrup line in a substantially vertical direction with respect to said counterweight mechanism.

2. The molluscan bivalve cage system as recited in claim 1 where said stirrup line length adjusting mechanism includes at least one stirrup line stopping mechanism releasably secured to a portion of said stirrup line for adjusting an overall length of said stirrup line.

3. The molluscan bivalve cage system as recited in claim 2 where said at least one stirrup line stopping mechanism includes a tubular member having a through opening through a sidewall thereof for insert of portion of said stirrup line for securement of said stirrup line to said tubular member.

4. The molluscan bivalve cage system as recited in claim 3 wherein said stirrup line is captured within said tubular member at a predetermined location to provide adjustability of the overall length of said at least one stirrup line.

5. The molluscan bivalve cage system as recited in claim 4 including a knot formed in said at least one stirrup line within said tubular member, said knot having a size greater than a diameter of said through opening.

6. The molluscan bivalve cage system as recited in claim 1 where said stirrup line guide includes a guide tubular member having a vertical through opening of greater diameter than said stirrup line diameter for displaceable movement of said stirrup line through said guide tubular member.

7. The molluscan bivalve cage system as recited in claim 6 where said guide tubular member is fixedly secured to said molluscan bivalve cage.

8. The molluscan bivalve cage system as recited in claim 1 where said adjustable stirrup mechanism includes at least a pair of stirrup lines secured to said counterweight mechanism on a pair of respective first ends thereof and to said pull line on a pair of respective second ends thereof.

9. The molluscan bivalve cage system as recited in claim 1 where said molluscan bivalve cage includes:
   (a) a main body having at least one baffle mounted therein for forming individual main body compartments; and,
   (b) a cage door mounted to said main body housing and releasably coupled thereto for enclosing said main body compartments.

10. The molluscan bivalve cage system as recited in claim 9 where said at least one baffle is formed of a liquid porous composition of sufficient porosity adapted to permit entry of molluscan bivalves into said main body.

11. The molluscan bivalve cage system as recited in claim 9 where said main body, said cage door, and said at least one baffle is formed of a mesh construction.

12. The molluscan bivalve cage system as recited in claim 9 where said main body is secured to said age door by a hinge.

13. The molluscan bivalve cage system as recited in claim 1 where said fixed buoyant mechanism includes at least one buoyant tubular member defining a fixed buoyant tubular member chamber for containing a gaseous or liquid composition.

14. The molluscan bivalve cage system as recited in claim 13 where said at least one tubular member includes a pair of end caps secured to said at least one buoyant tubular member on opposing ends of said buoyant tubular member for containing said gaseous or liquid composition within said fixed buoyant tubular member chamber.

15. The molluscan bivalve cage system as recited in claim 14 where said at least one buoyant tubular member is formed of a liquid impervious composition.

16. The molluscan bivalve cage system as recited in claim 15 where said at least one buoyant tubular member is formed of a plastic composition.

17. The molluscan bivalve cage system as recited in claim 1 including:
   (a) a buoy having a density less than the density less than the density of a surrounding marine environment; and,
   (b) a buoy line attached on opposing ends to said buoy and said molluscan bivalve cage.

* * * * *